(12) United States Patent
Chang

(10) Patent No.: US 9,167,930 B2
(45) Date of Patent: Oct. 27, 2015

(54) DRY FRYER WITH STIRRING FUNCTION AND HEATING COVER THEREOF

(71) Applicant: Tall & Stout Industrial Corp., Shenzhen (CN)

(72) Inventor: Kuei-Tang Chang, Shenzhen (CN)

(73) Assignee: TALL & STOUT INDUSTRIAL CORP., Shenzhen (CN)

( * ) Notice: Subject to any disclaimer, the term of this patent is extended or adjusted under 35 U.S.C. 154(b) by 292 days.

(21) Appl. No.: 13/766,548

(22) Filed: Feb. 13, 2013

(65) Prior Publication Data

US 2014/0224132 A1    Aug. 14, 2014

(51) Int. Cl.
*A21B 7/00*    (2006.01)
*A47J 27/00*    (2006.01)
(Continued)

(52) U.S. Cl.
CPC .............. *A47J 27/002* (2013.01); *A47J 37/103* (2013.01)

(58) Field of Classification Search
CPC ..... A47J 37/103; A47J 27/002; A47J 27/004; A47J 27/08; A47J 31/042; A47J 36/20; A47J 37/041; A47J 37/042; A47J 37/043; A47J 37/047; H01L 31/042; Y02E 10/50
USPC ............. 99/288, 329 R, 329 P, 329 RT, 33, 8, 99/324–371, 372–384, 385–450, 451, 99/452–466, 467–482, 483–643; 426/385, 426/388, 390, 392–415, 438, 443, 523; 126/344, 245, 348, 373.1, 375.1, 126/376.1, 378.1, 383.1, 384.1, 385.1, 126/387.1, 388.1–390.1, 350.1–363.1, 99 R, 126/100, 101, 100 R, 110 A, 100 AA, 110 B, 126/110 C, 110 D, 116 C, 117, 106, 108, 126/109, 107, 104 R, 104 A, 112, 114, 126/105 R, 105 A, 99 A, 99 C; 219/385, 386, 219/395, 400, 402, 411, 440, 490, 492, 497, 219/501, 502, 506
See application file for complete search history.

(56) References Cited

U.S. PATENT DOCUMENTS 2,262,912 A * 11/1941 Behar .............................. 310/66
3,097,318 A *  7/1963 Jepson ........................ 310/68 R
(Continued)

FOREIGN PATENT DOCUMENTS

CN        2561327 Y      7/2003
CN     201529027 U      7/2010
(Continued)

OTHER PUBLICATIONS

China Official Action report issued on Jul. 10, 2013.

*Primary Examiner* — Dana Ross
*Assistant Examiner* — Gyounghyun Bae
(74) *Attorney, Agent, or Firm* — Chun-Ming Shih; HDLS IPR Services

(57) ABSTRACT

A roaster (1) and heating cover (20) thereof are disclosed. The roaster (1) includes a pot (10) and a heating cover (20) covered correspondingly thereon. An inner space of a cover body is separated into an installing chamber (2110) and a hot air chamber (2111). A first motor (22) and a second motor (24) are fixed in the installing chamber (2110). The hot air supply module (23) is disposed in the hot air chamber (2111), and a group of the reduction gears (25) is driven by the second motor (24). A stirring component (26) connecting the group of the reduction gears (25) is disposed in the hot air chamber (2111). Thus an inner space of the roaster (1) will be maintained for flipping the ingredients.

13 Claims, 6 Drawing Sheets

(51) Int. Cl.
*A47J 27/62* (2006.01)
*A47J 37/10* (2006.01)

(56) References Cited

U.S. PATENT DOCUMENTS

| | | | | |
|---|---|---|---|---|
| 3,972,277 | A | * | 8/1976 | Tamano ........................... 99/451 |
| 4,817,509 | A | * | 4/1989 | Erickson ........................ 99/330 |
| 5,165,328 | A | * | 11/1992 | Erickson et al. ................ 99/330 |
| 5,404,420 | A | * | 4/1995 | Song ............................. 392/416 |
| 5,466,912 | A | * | 11/1995 | Dornbush et al. ............. 219/400 |
| 5,485,780 | A | * | 1/1996 | Koether et al. ................. 99/419 |
| 6,098,526 | A | * | 8/2000 | Stein et al. ................... 99/323.9 |
| 6,198,076 | B1 | * | 3/2001 | Moen et al. .................... 219/400 |
| 6,747,250 | B1 | * | 6/2004 | Cha ............................... 219/400 |
| 6,936,795 | B1 | * | 8/2005 | Moon et al. .................... 219/400 |
| 7,360,533 | B2 | * | 4/2008 | McFadden .................. 126/21 A |
| 2005/0034609 | A1 | | 2/2005 | Stephanou |
| 2009/0308262 | A1 | * | 12/2009 | McGuigan .................. 99/421 R |
| 2012/0012011 | A1 | * | 1/2012 | Millikin et al. ................. 99/410 |

FOREIGN PATENT DOCUMENTS

| | | |
|---|---|---|
| CN | 201814414 U | 5/2011 |
| CN | 201968506 U | 9/2011 |
| CN | 202027433 U | 11/2011 |

* cited by examiner

DRY FRYER WITH STIRRING FUNCTION AND HEATING COVER THEREOF

BACKGROUND OF THE INVENTION

1. Field of the Invention

The present invention generally relates to roasters and, in particular to a roaster with stirring function and heating cover thereof.

2. Description of Related Art

Currently, heating devices of roasters on markets are usually provided on the cover body. The high-temperature airflow produced from the cover body is blown to ingredients disposed in the pot for heating continuously. Moreover, a roaster further has stirring function for flipping ingredients (such as French fries or corns) in the pot, thus ingredients in the pot can be exposed to the high-temperature airflow comprehensively to achieve uniform heating.

Stirring function of a roaster is performed through an actuating element that drives a group of reduction gears and a stirring blade to achieve flipping ingredients. According to the group of reduction gears of a roaster is mostly disposed at the bottom of the inner pot, and a linking mechanism is needed for connecting the group of reduction gears disposed at the bottom of the inner pot. At the mean time, an inner space of the roaster will be reduced.

In view of the above drawbacks, the Inventor proposes the present invention based on his expert knowledge and elaborate researches in order to solve the problems of related art.

SUMMARY OF THE INVENTION

Accordingly, an object of the present invention is to provide a roaster with stirring function and heating cover thereof, an inner space of the roaster will be maintained to achieve flipping ingredients.

In order to achieve the object mentioned above, the present invention provides a heating cover of the roaster comprising a cover body, a motor, a hot air supply module, an actuator, a group of reduction gears and a stirring component. The cover body has a casing and a separating plate, and an inner space of the casing is separated into an installing chamber and a hot air chamber by the separating plate. The motor having a first driving shaft is fixed in the installing chamber. The hot air supply module having a heating element and a blower impeller rotated by the driving of first driving shaft is disposed in the hot air chamber. The actuator fixed in the installing chamber and located at a lateral side of the motor has a second driving shaft. The group of reduction gears is driven by the second driving shaft. The stirring component connecting with the group of the reduction gears is disposed in the hot air chamber.

In order to achieve the object mentioned above, the present invention provides a roaster with stirring function comprising a pot and a heating cover. The pot has an ingredient chamber and an opening formed on a top of the ingredient chamber. The heating cover covers on the opening correspondingly. The heating cover comprises a cover body, a motor, a hot air supply module, an actuator, a group of reduction gears and a stirring component. The cover body has a casing and a separating plate, and an inner space of the casing is separated into an installing chamber and a hot air chamber by the separating plate. The motor having a first driving shaft is fixed in the installing chamber. The hot air supply module having a heating element and a blower impeller rotated by the driving of first driving shaft is disposed in the hot air chamber. The actuator fixed in the installing chamber and located at a lateral side of the motor has a second driving shaft. The group of reduction gears is driven by the second driving shaft. The stirring component connecting with the group of the reduction gears is disposed in the hot air chamber.

Another object of the present invention is to provide a roaster with stirring function and heating cover thereof. The cover body is provided with a heating switch and a stirring switch for controlling the motor and the actuator correspondingly. Thus the operating of hot air supply module and the stirring component are controlled for users as demands.

Comparing to the related art, the separating plate of the present invention separates an inner space of the heating cover into an installing chamber and a hot air chamber. The motor and the actuator are disposed in the installing chamber, and the hot air supply module is disposed in the hot air chamber. The actuator drives the group of reduction gears and the stirring component rotating. Because the group of reduction gears of the present invention has advantages of simple structure, eases of manufacturing, low failure rate and occupied less space of the ingredients chamber, it is easy to rotate the stirring component for operating. Moreover, the motor and the actuator drive the hot air supply module and the stirring component correspondingly for user operating as demands.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
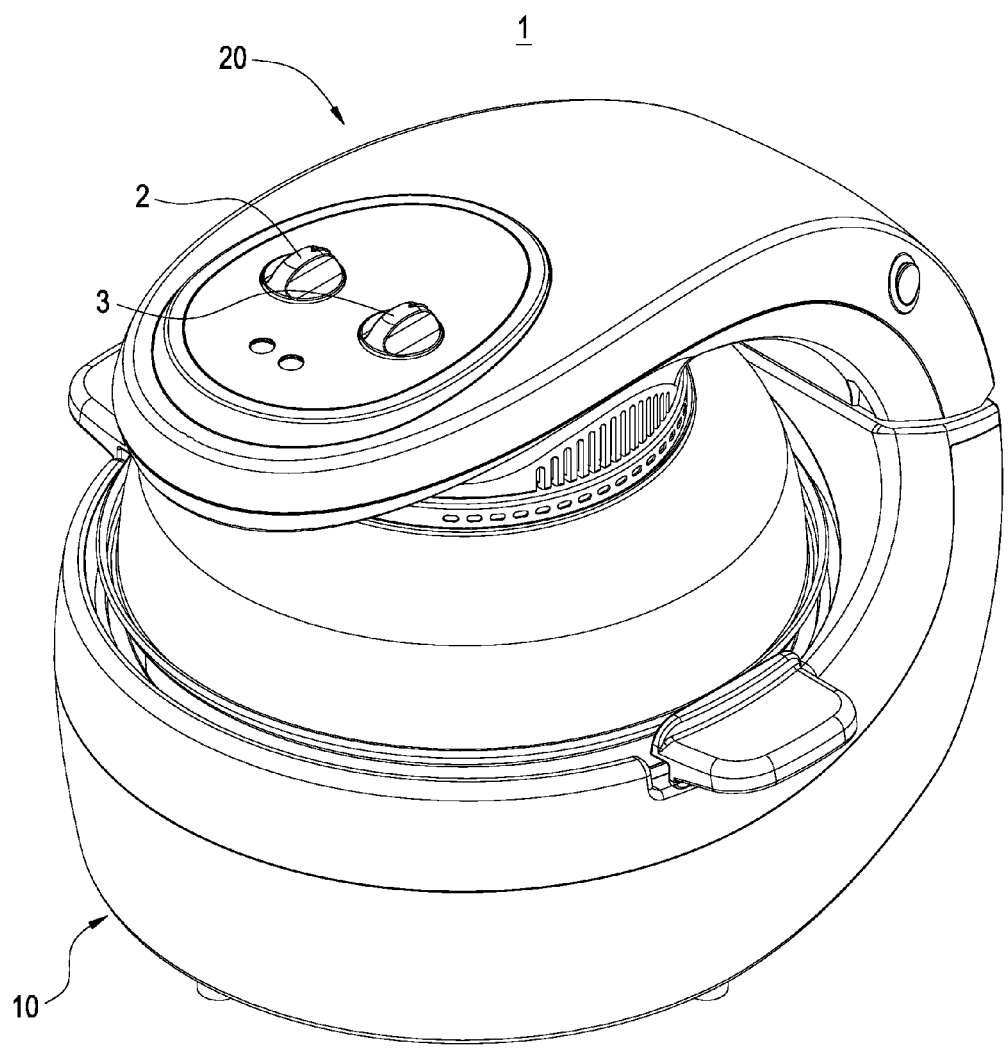
FIG. 1 is a perspective schematic view of roaster of the present invention.

Please refer to FIG. 1, which depicts a perspective schematic view of roaster of the present invention. The roaster 1 includes a pot 10 and a heating cover 20. The heating cover 20 covers the pot 10, and the heating cover 20 provides hot airflow for heating ingredients in the pot 10.

Figure 2:
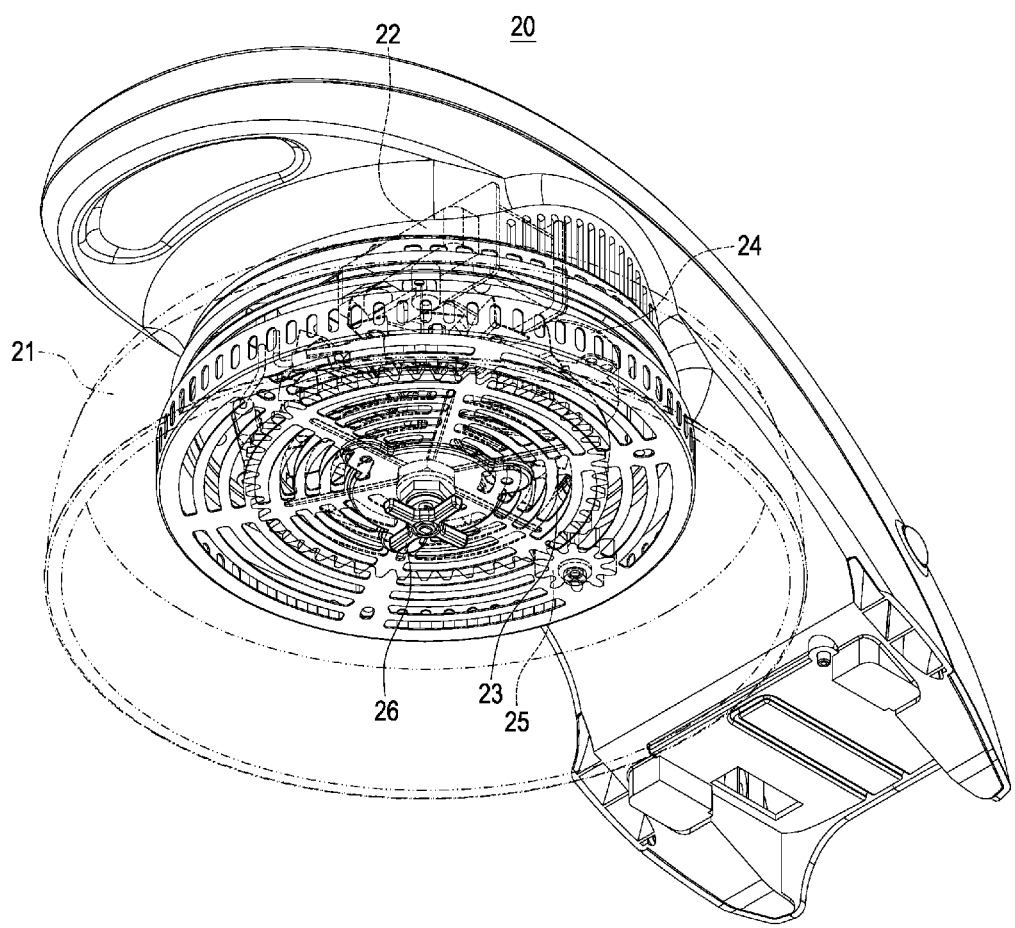
FIG. 2 is a perspective schematic view of heating cover of the present invention.

With refer to FIG. 2, which depicts a perspective schematic view of heating cover of the present invention. The heating cover 20 includes a cover body 21, a motor 22, a hot air supply module 23, an actuator 24, a group of reduction gears 25 and a stirring component 26. The actuator 24 drives the group of reduction gears 25, and the group of reduction gears 25 rotates the stirring component 26 for slipping ingredients in the pot 10.

In an embodiment of the present invention, the cover body 21 further includes a heating switch 2 and a stirring switch 3. The heating switch 2 is electrically connected with the motor 22, and the stirring switch 3 is electrically connected with the actuator 24. That is, the heating switch 2 controls an operating of hot air supply module 23, and the stirring switch 3 controls an operating of the stirring components 26.

Figure 3:
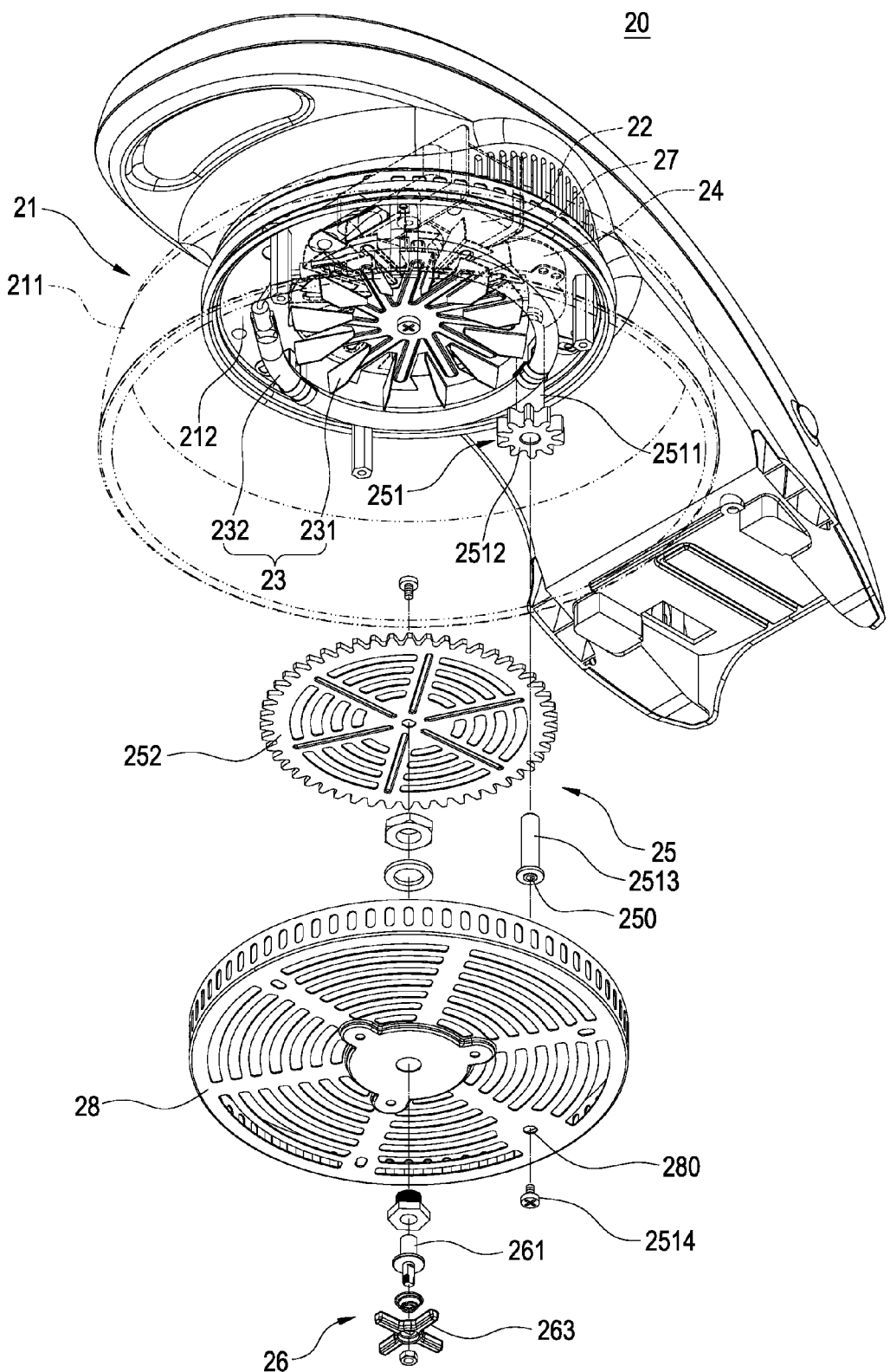
FIG. 3 is a partially perspective exploded view of the present invention.
Figure 4:
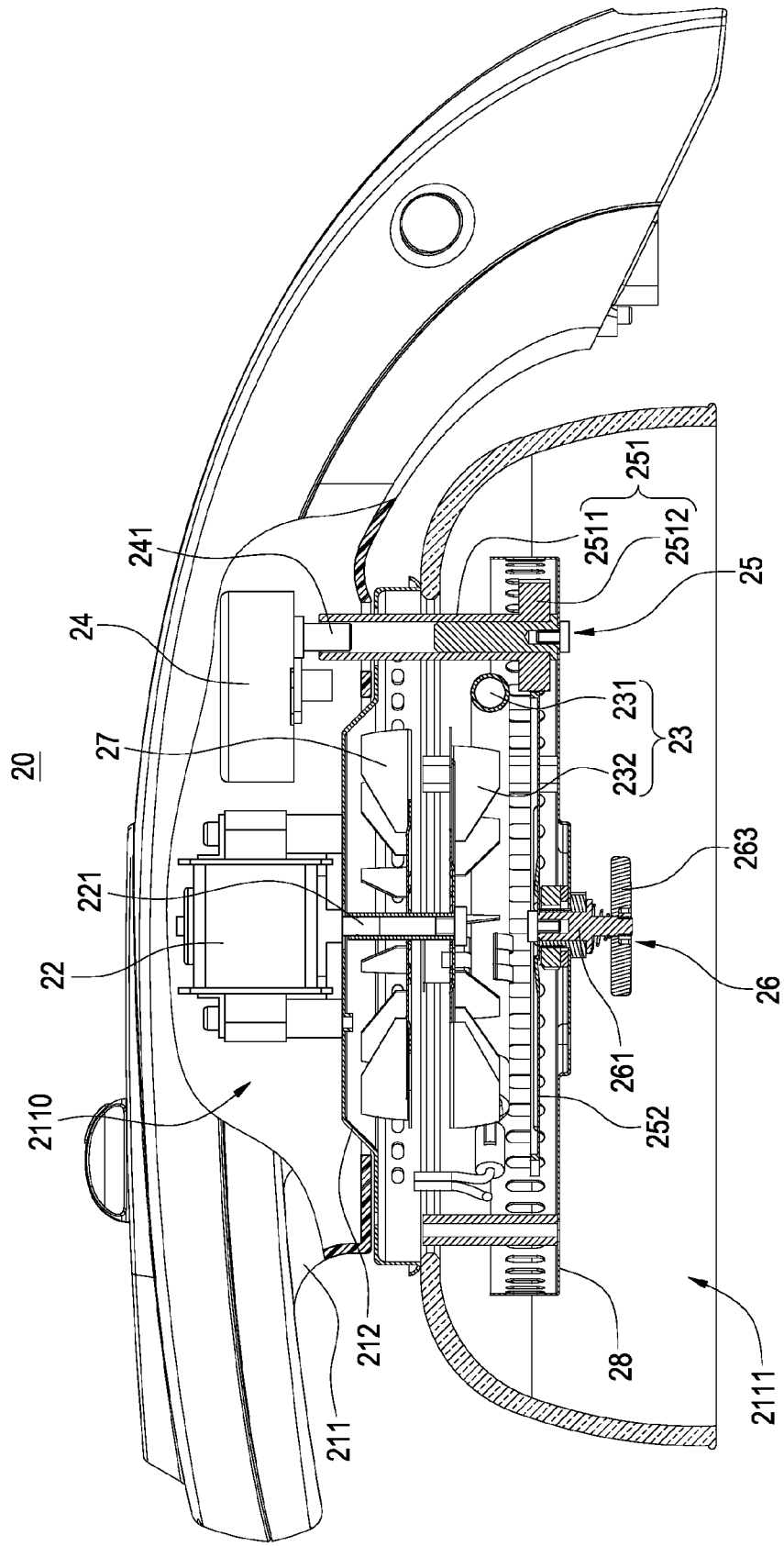
FIG. 4 is a cross sectional view of heating cover of the present invention.

Please further refer to FIG. 3 and FIG. 4, which depict a partial perspective explosion view and a cross sectional view of heating cover of the present invention. The cover 21 has a casing 211 and a separating plate 212, and the separating plate 212 separates an inner space of the casing 211 into an installing chamber 2110 and a hot air chamber 2111. The motor 22 has a first driving shaft 221 fixed in the installing chamber 2110.

The hot air supply module 23 is disposed in the hot air chamber 2111. The hot air supply module 23 includes a heating element 231 fixed under the separating plate 212 and a blower impeller 232 located around the heating element 231, and the blower impeller 232 is rotated by the driving of first driving shaft 221. The heating element 231 is used for providing heat energy, and can be implemented as a traditional electric heating pipe or a halogen heating tube.

In an embodiment of the present invention, the heating cover 20 further includes a heat dissipating fan 27 positioned between the motor 22 and the blower impeller 232. The heat dissipating fan 27 is shafted on the first driving shaft 221, and the heat dissipating fan 27 is used for dissipating the heat in the installing chamber 2110 by blowing air.

The actuator 24 is fixed in the installing chamber 2110 and located at a lateral side of the motor 22. The actuator 24 has a second driving shaft 241, and the group of reduction gears 25 is driven by the second driving shaft 241. Moreover, the stirring component 26 is disposed in the hot air chamber 2111. The stirring component 26 is connected with the group of the reduction gears 25 and rotated by the group of the reduction gears 25. More detailed description of the group of the reduction gears 25 will be described as following.

The group of the reduction gears 25 includes a first gear 251 connecting the second driving shaft 241 and a second gear 252 connecting the first gear 251, and the stirring component 26 is shafted on the second gear 252.

In an embodiment of the present invention, the first gear 251 includes a transmission shaft 2511 sleeved on the outer of the first driving shaft 221 and a transmission gear 2512 connecting the transmission shaft 2511.

Preferably, the heating cover 20 further includes a supporting net 28. The supporting net 28 and the separating plate 212 are located on two opposite sides of the hot air supply module 23. Besides, the first gear 251 further includes a screw 2514 and a penetrating pole 2513 having a screw hole 250.

While the supporting net 28 is assembled, the supporting net 28 is provided with a penetrating hole 280 corresponding to the screw hole 250. The penetrating pole 2513 passes through the transmission gear 2512. The screw 2514 passes through the penetrating hole 280 and fixes in the screwing hole 250 for fastening the supporting net 28 to the heating cover 20. Furthermore, the stirring component 26 includes a rotating shaft 261 passing through the supporting net 28 for combining on the second gear 252.

Figure 5:
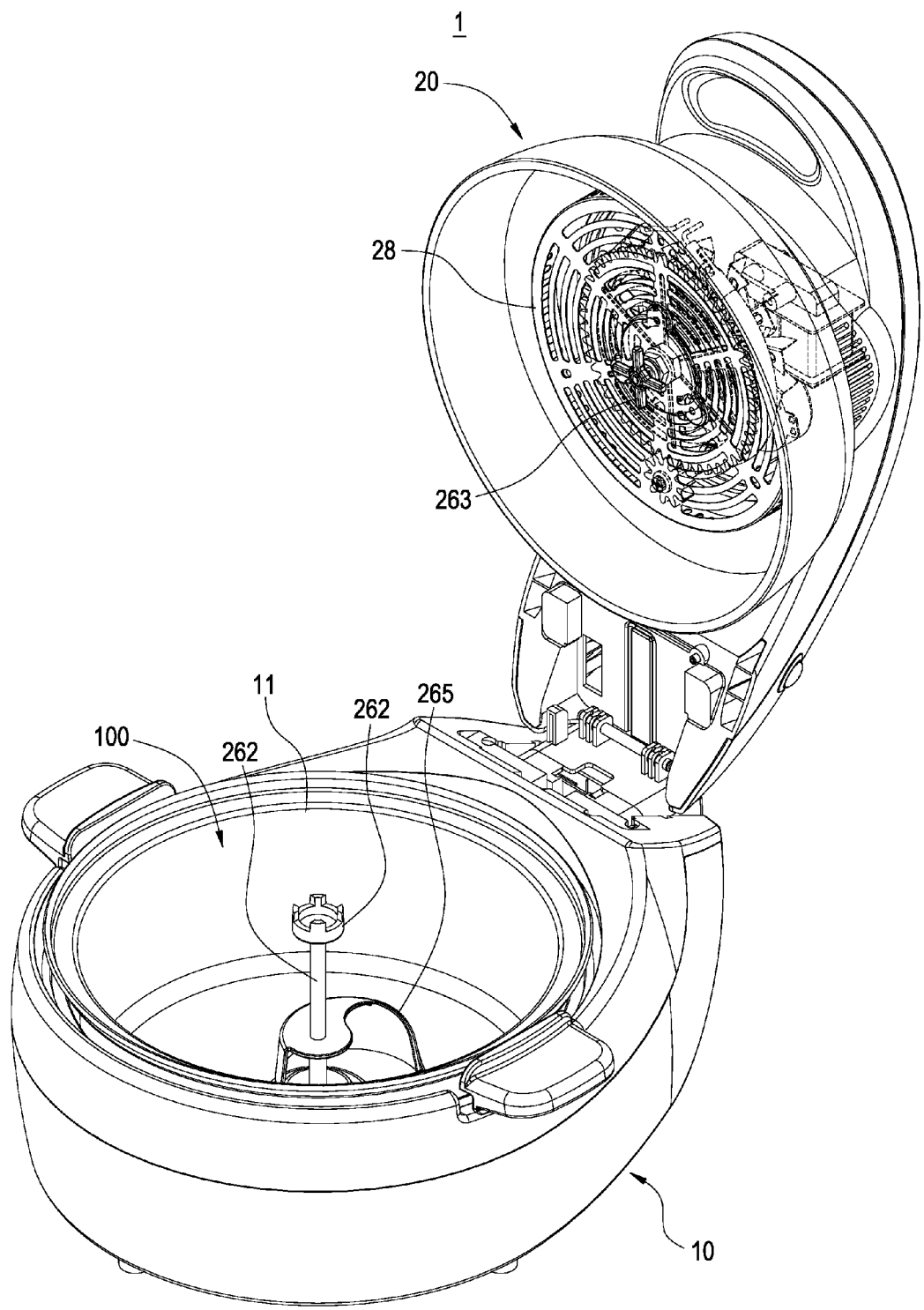
FIG. 5 is a schematic view showing the opened heating cover of the present invention.
Figure 6:
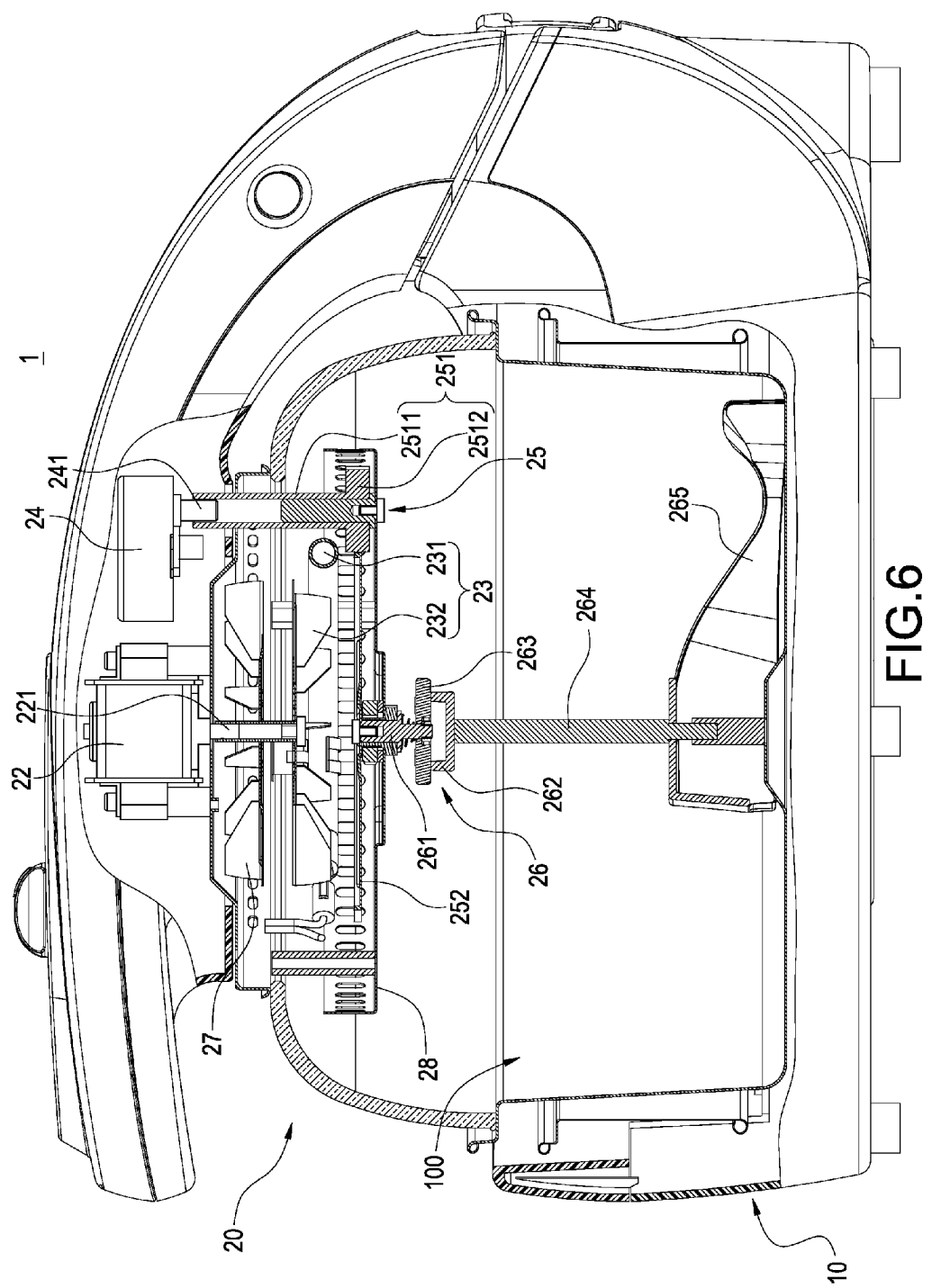
FIG. 6 is a cross sectional view of the roaster of the present invention.

Please refer to FIG. 5 and FIG. 6, which depict a schematic view of the opened heating cover and a cross sectional view of the roaster of the present invention. The pot 10 has an ingredient chamber 100 and an opening 11 formed on a top of the ingredient chamber 100, and the heating cover 20 covers correspondingly on the opening 11.

In an embodiment, the stirring component 26 further includes a pawl 262 connecting the rotating shaft 261, a transfer ring 263 engaging with the pawl 262, a supporting shaft 264 fixed in the ingredient chamber 100, and a stirring blade 265 connecting the supporting shaft 264. Thus, the motor 22 drives the first driving shaft 221, and the heat dissipating fan 27 and the blower impeller 232 are driven through the first driving shaft 22. The stirring component 26 is rotated by the driving of the actuator 24 and the group of the reduction gears 25, thus achieving the advantages of simple structure, eases of assembly, and low failure rate.

In another aspect, the actuator 24 drives the second driving shaft 241 rotating, and the second driving shaft 241 will drives the group of the reduction gears 25 rotating. The group of the reduction gears 25 further drives the stirring component 26 rotating. Thus the stirring component 26 is rotated around the ingredient chamber 100 for flipping the ingredients.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A heating cover (20) of a roaster (1), comprising:
 a cover body (21) having a casing (211) and a separating plate (212), an inner space of the casing (211) separated by the separating plate (212) into an installing chamber (2110) and a hot air chamber (2111);
 a first motor (22) fixed in the installing chamber (2110) of the cover body (21) and having a first driving shaft (221);
 a hot air supply module (23) disposed in the hot air chamber (2111) and having a heater (231) and a blower impeller (232) disposed in the hot air chamber (2111) and rotated by the driving of first driving shaft (221);
 a second motor (24) fixed in the installing chamber (2110), the second motor (24) located at a lateral side of the first motor (22) and having a second driving shaft (241);
 a group of reduction gears (25) driven by the second driving shaft (241); and
 a stirring component (26) disposed in the hot air chamber (2111) and connected with the group of the reduction gears (25),
 wherein the group of the reduction gears (25) includes a first gear (251) connecting the second driving shaft (241) and a second gear (252) connecting the first gear (251), and the stirring component (26) is shafted on the second gear (252);
 wherein the first gear (251) includes a transmission shaft (2511) sleeved on the outer of the first driving shaft (221) and a transmission gear (2512) connecting the transmission shaft (2511).

2. The heating cover (20) according to claim 1, further including a heat dissipating fan (27) positioned between the first motor (22) and the blower impeller (232), wherein the heat dissipating fan (27) is shafted on the first driving shaft (221).

3. The heating cover (20) according to claim 1, further including a supporting net (28), the supporting net (28) and the separating plate (212) are located on two opposite sides of the hot air supply module (23).

4. The heating cover (20) according to claim 3, wherein the first gear (251) further includes a screw (2514) and a penetrating pole (2513) having a screw hole (250), the penetrating pole (2513) passes through the transmission gear (2512), the supporting net (28) is provided with a penetrating hole (280) corresponding to the screw hole (250), and the screw (2514) passes through the penetrating hole (280) and fixes in the screwing hole (250).

5. The heating cover (20) according to claim 3, wherein the stirring component (26) includes a rotating shaft (261) and a stirring blade (265) connecting with the rotating shaft (261), and the rotating shaft (261) passes through the supporting net (28) for combining on the second gear (252).

6. The heating cover (20) according to claim 1, further including a heating switch (2) and a stirring switch (3), wherein the heating switch (2) is electrically connected with the first motor (22), and the stirring switch (3) is electrically connected with the second motor (24).

7. A roaster (1) with stirring function, comprising:
- a pot (10) having an ingredient chamber (100) and an opening (11) formed on a top of the ingredient chamber (100); and
- a heating cover (20) covering correspondingly the opening (11) of the pot (10), the heating cover (20), comprising:
  - a cover body (21) having a casing (211) and a separating plate (212), and an inner space of the casing (211) separated into an installing chamber (2110) and a hot air chamber (2111) by the separating plate (212);
  - a first motor (22) fixed in the installing chamber (2110) and having a first driving shaft (221);
  - a hot air supply module (23) disposed in the hot air chamber (2111), the hot air supply module (23) having a heater (231) and a blower impeller (232) disposed in the hot air chamber (2111) and rotated by the driving of first driving shaft (221);
  - a second motor (22) fixed in the installing chamber (2110) of the cover body (21) and located at a lateral side of the first motor (22) and having a second driving shaft (241);
  - a group of reduction gears (25) driven by the second driving shaft (241); and
  - a stirring component (26) disposed in the hot air chamber (2111) and connected with the group of the reduction gears (25),
  wherein the group of the reduction gears (25) includes a first gear (251) connecting the second driving shaft (241) and a second gear (252) connecting the first gear (251), and the stirring component (26) is shafted on the second gear (252);
  wherein the first gear (251) includes a transmission shaft (2511) sleeved on the outer of the first driving shaft (221) and a transmission gear (2512) connecting the transmission shaft (2511).

8. The roaster (1) according to claim 7, wherein the heating cover (20) further includes a heat dissipating fan (27) positioned between the first motor (22) and the blower impeller (232), and the heat dissipating fan (27) is shafted on the first driving shaft (221).

9. The roaster (1) according to claim 7, wherein the heating cover (20) further includes a supporting net (28), the supporting net (28) and the separating plate (212) are located on two opposite sides of the hot air supply module (23).

10. The roaster (1) according to claim 9, wherein the first gear (251) further includes a screw (2514) and a penetrating pole (2513) having a screw hole (250), the penetrating pole (2513) passes through the transmission gear (2512), the supporting net (28) is provided with a penetrating hole (280) corresponding to the screw hole (250), and the screw (2514) passes through the penetrating hole (280) and fixes in the screwing hole (250).

11. The roaster (1) according to claim 9, wherein the stirring component (26) includes a rotating shaft (261) and the rotating shaft (261) passes through the supporting net (28) for combining on the second gear (252).

12. The roaster (1) according to claim 11, wherein the stirring component (26) includes a pawl (262) connecting the rotating shaft (261), a transfer ring (263) engaging with the pawl (262), a supporting shaft (264) fixed in the ingredient chamber (100), and a stirring blade (265) connecting the supporting shaft (264).

13. The roaster (1) according to claim 7, wherein the heating cover (20) further includes a heating switch (2) and a stirring switch (3), the heating switch (2) is electrically connected with the first motor (22), and the stirring switch (3) is electrically connected with the second motor (24).

\* \* \* \* \*